(12) United States Patent
Adinarayana et al.

(10) Patent No.: US 10,819,543 B2
(45) Date of Patent: Oct. 27, 2020

(54) COMMON MODE TRANSIENT IMMUNITY CIRCUIT FOR OPTO-ISOLATOR EMULATION

(71) Applicant: Texas Instruments Incorporated, Dallas, TX (US)

(72) Inventors: Sudhir Komarla Adinarayana, Bangalore (IN); Sreenivasa S Mallia, Kerala (IN); Sreeram Subramanyam Nasum, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 479 days.

(21) Appl. No.: 15/354,149

(22) Filed: Nov. 17, 2016

(65) Prior Publication Data
US 2017/0201399 A1 Jul. 13, 2017

Related U.S. Application Data (60) Provisional application No. 62/277,354, filed on Jan. 11, 2016, provisional application No. 62/277,335, filed on Jan. 11, 2016.

(51) Int. Cl.
*H02H 1/00* (2006.01)
*H02H 1/04* (2006.01)
(Continued)

(52) U.S. Cl.
CPC .......... *H04L 27/04* (2013.01); *H04B 1/0475* (2013.01); *H04B 1/40* (2013.01); *H04B 1/69* (2013.01); *H04B 3/30* (2013.01)

(58) Field of Classification Search
CPC .. H01L 27/04; H04B 1/40; H04B 1/69; H04B 1/0475; H04B 2001/0408
(Continued)

(56) References Cited

U.S. PATENT DOCUMENTS

| | | | | |
|---|---|---|---|---|
| 4,947,063 A | * | 8/1990 | O'Shaughnessy | H03K 17/163 326/103 |
| 5,631,537 A | * | 5/1997 | Armstrong | G05F 3/242 320/116 |

(Continued)

OTHER PUBLICATIONS

A. Allessandria, L. LaMagna, M. Renna, L Fragapane, and S. Coffa, "Integrated Si-based Opto-Couplers: a Novel Approach to Galvanic Isolation," Solid-State Device Research Conference, 2002, Proceedings of the 32nd European, Sep. 2002, pp. 647-650 (4 pages).

(Continued)

*Primary Examiner* — Jared Fureman
*Assistant Examiner* — Lucy M Thomas
(74) *Attorney, Agent, or Firm* — John R. Pessetto; Charles A. Brill; Frank D. Cimino (57) ABSTRACT

An isolator chip includes a transmitter circuit coupled to provide differential output signals to respective first terminals of a first and a second capacitor and a receiver circuit coupled to receive the differential output signals from respective second terminals of the first and second capacitors. The transmitter circuit includes a voltage-clamping circuit coupled to receive an input signal and to provide a clamped signal, an oscillator coupled to receive the clamped signal and to provide the differential output signals, and a common mode transient immunity (CMTI) circuit that couples respective first terminals of the first and second capacitors to a lower rail responsive to the clamped signal being low.

12 Claims, 5 Drawing Sheets

(51) Int. Cl.
  *H02H 3/22* (2006.01)
  *H02H 9/06* (2006.01)
  *H01C 7/12* (2006.01)
  *H04L 27/04* (2006.01)
  *H04B 3/30* (2006.01)
  *H04B 1/04* (2006.01)
  *H04B 1/40* (2015.01)
  *H04B 1/69* (2011.01)

(58) Field of Classification Search
  USPC ............ 361/56, 111; 327/546, 548; 375/219
  See application file for complete search history.

(56) References Cited

U.S. PATENT DOCUMENTS

| | | | | |
|---|---|---|---|---|
| 6,411,173 | B1* | 6/2002 | Eddy | H03H 7/42 |
| | | | | 333/25 |
| 6,664,865 | B2* | 12/2003 | Groe | H03L 5/00 |
| | | | | 331/183 |
| 8,867,592 | B2* | 10/2014 | Shrestha | H04L 25/0268 |
| | | | | 307/104 |
| 9,621,383 | B1* | 4/2017 | Urienza | H04L 25/0266 |
| 2009/0003484 | A1* | 1/2009 | Li | H04B 1/707 |
| | | | | 375/271 |
| 2009/0069648 | A1* | 3/2009 | Irazoqui | A61B 3/16 |
| | | | | 600/302 |
| 2010/0302692 | A1* | 12/2010 | Groenewold | H03F 1/523 |
| | | | | 361/42 |
| 2015/0004907 | A1* | 1/2015 | Subramoniam | H04B 5/0031 |
| | | | | 455/41.1 |
| 2015/0381116 | A1* | 12/2015 | Wu | H03F 3/45179 |
| | | | | 330/253 |
| 2015/0381219 | A1* | 12/2015 | Kramer | H04B 1/0475 |
| | | | | 375/297 |

OTHER PUBLICATIONS

P. Mahalingam, D. Guiling, and S. Lee, "Manufacturing Challenges and Method of Fabrication of On-Chip Capacitive Digital Isolators," Semiconductor Manufacturing, International Symposium, Oct. 2007 (4 pages).

S. Kaeriyama, S. Uchida, M. Furumiya, M. Okada, T. Maeda, and M. Mizuno, "A 2.5 KV Isolation 35 KV Isolation 35 KV/ps CMR 250 MBPS Digital Isolator in Standard CMOS With a Small Transformer Driving Technique," Solid-State Circuits, IEEE Journal, vol. 47, No. 2, Feb. 2012, pp. 435-443 (9 pages).

J. Keller, "Design Driven LED Degradation Model for Opto-Isolators," Electronic Components and Technology Conference, May 1992, pp. 394-398 (5 pages).

T. Xia and P. Peng, "A Spread-Spectrum Clock Generator with Dual-Voltage Controlled Oscillator," Circuits and Systems and TAISA Conference, 2008, NEWCAS-TAISA 2008, 2008 Joint 6th International IEEE Northeast Workshop, Jun. 2008 (4 pages).

R. Widlar, "New Developments in IC Voltage Regulators," Solid-State Circuits, IEEE Journal, vol. 6, No. 1, pp. 2-7, Feb. 1971 (6 pages).

Y. T. Wang, C. Zhao, R. Geiger, D. Chen and S.-C. Huang, "Performance Verification of Start-Up Circuits in Reference Generators," Circuits and Systems, 2012 IEEE, 55th International Midwest Symposium, Aug. 2012, pp. 518-521 (4 pages).

* cited by examiner

COMMON MODE TRANSIENT IMMUNITY CIRCUIT FOR OPTO-ISOLATOR EMULATION

CLAIM OF PRIORITY AND RELATED PATENT APPLICATIONS

This nonprovisional application claims priority based upon the following prior United States provisional patent application(s): (i) "Common Mode Transient Immunity Improvement Circuit for Opto-Emulators," Application No. 62/277,335, filed Jan. 11, 2016; and (ii) "Common Mode Transient Immunity Improvement Circuit for Opto-Emulators," Application No. 62/277,354, filed Jan. 11, 2016, both filed in the name(s) of Sudhir Komarla Adinarayana, Sreenivasa Mallia S [sic] and Sreeram Nasum Subramanyam [sic]; which are hereby incorporated by reference in their entirety.

FIELD OF THE DISCLOSURE

Disclosed embodiments relate generally to the field of communications across an isolation device. More particularly, and not by way of any limitation, the present disclosure is directed to a circuit for common mode transient immunity for opto-isolator emulation.

BACKGROUND

Isolators are the interface circuits that provide galvanic isolation between two communicating blocks. Isolators are required to eliminate avoidable ground loops, and also to protect high voltage sensitive circuits. These circuits ensure electric insulation and signal isolation between the circuits, i.e. it does not allow electrons to flow from one circuit to the other, while at the same time ensuring reliable data transmission between the two circuits, isolating the signal from common mode noise and fast transients. In applications where common mode noise can be expected and human interactions are inevitable (e.g., cardiograph), then the isolator acts as an interface, ensuring safety and reliability. In several industrial applications which are susceptible to electrical surges, fast transients and high noise floors, isolators are used for safety and reliability.

An isolation barrier can be considered the core of an isolator. Depending on the medium used as isolation barrier and the physical quality used to transfer data across the barrier, isolators are classified as opto-isolators, capacitive isolators and inductive isolators. Conventionally, opto-isolators have been deployed because of low cost, ease of fabrication, and lack of both radiative emissions and susceptibility to radiative emissions. However, opto-isolators suffer from limitations such as low speed of operation (i.e., 50 Mbps), temperature instability, degradation of LED performance over time, and the difficulty fabricating multichannel devices because of cross talk issues. Common Mode Transient Immunity (CMTI) represents a rate of change of common mode voltage that can be tolerated, as it does not affect the output of the device. CMTI of opto-isolators is lower than desired, e.g., less than 35 KV/µs.

With recent developments in CMOS technology, CMOS digital isolators are competing with opto-isolators with respect to speed and reliability. However, numerous systems currently use opto-isolators. Rather than requiring replacement systems designed around newer CMOS digital isolators, digital isolators that can be utilized in place of existing opto-isolators are desirable.

SUMMARY

Disclosed embodiments implement an ON/OFF Keying (OOK) transmitter based on capacitive isolation. In at least one embodiment, the disclosed capacitive isolation package can be used as drop-in replacement for a conventional opto-isolator in which the data signal provides the power used by the transmitter. Using the disclosed capacitive isolation package, little or no change to the rest of the system is necessary. In order to prevent CMTI events from causing false turn-on of the transmitter, a novel CMTI circuit is disclosed that drains the charge on the transmitter side of the capacitors responsive to the input signal being low.

In one aspect, an embodiment of an isolator chip is disclosed. The isolator chip includes a transmitter circuit coupled to provide differential output signals to respective first terminals of a first and a second capacitor, the transmitter circuit comprising: a voltage-clamping circuit coupled to receive an input signal and to provide a clamped signal, an oscillator coupled to receive the clamped signal and to provide the differential output signals, and a common mode transient immunity (CMTI) circuit that couples the respective first terminals of the first and second capacitors to a lower rail responsive to the clamped signal being low; and a receiver circuit coupled to receive the differential signals from respective second terminals of the first and second capacitors.

In another aspect, an embodiment of an ON-OFF Keying (OOK) transmitter is disclosed. The OOK transmitter includes an oscillator coupled to provide a first signal to a first terminal of a first capacitor and to provide a second signal to a first terminal of a second capacitor, the first and the second signals forming a differential pair; a voltage-clamping circuit coupled to receive an input signal and to provide a clamped signal to the oscillator; and a common mode transient immunity (CMTI) circuit coupled to conduct a voltage on the first terminal of the first capacitor to a lower rail and to conduct a voltage on the second terminal of the second capacitor to the lower rail when the clamped signal is low.

In yet another aspect, an embodiment of a common mode transient immunity (CMTI) circuit for an ON-OFF keying transmitter is disclosed. The CMTI circuit includes first, second, third and fourth PMOS transistors each having a gate coupled to an input signal provided to an oscillator, the first and second PMOS transistors each having a source coupled to a first output signal of the oscillator, the third and fourth PMOS transistors each having a source coupled to a second output signal of the oscillator, the first and second output signals being differential signals, the second and third PMOS transistor each having a drain coupled to a lower rail; and first, second, third and fourth NMOS transistors, the first and fourth NMOS transistors each having a drain coupled to the input signal and a source coupled to the lower rail, the second NMOS transistor having a drain coupled to a drain of the first PMOS transistor, the third NMOS transistor having a drain coupled to a drain of the fourth PMOS transistor, the first and second NMOS transistors having respective gates coupled together and to the drain of the second NMOS transistor, the third and fourth NMOS transistors having respective gates coupled together and to the drain of the third NMOS transistor.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described. In other instances, well-known features have not been described in detail to avoid unnecessarily complicating the description. As used herein, the term "couple" or "couples" is intended to mean either an indirect or direct electrical connection unless qualified as in "communicably coupled" which may include wireless connections. Thus, if a first device couples to a second device, that connection may be through a direct electrical connection, or through an indirect electrical connection via other devices and connections.

Figure 4:
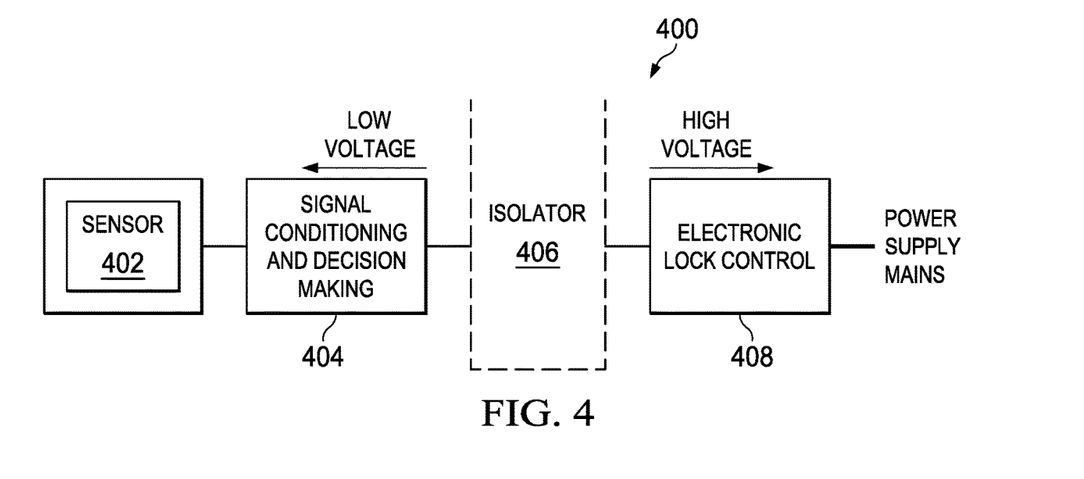
FIG. 4 illustrates a system that can utilize an embodiment of the disclosed isolator chip.

Turning first to FIG. 4, a block diagram of a system 400 that uses an isolator is shown. In this figure, sensor 402 takes in bio-metric information, which is processed by signal conditioning and decision making block 404 to determine whether the user is authorized or not. Based on the decision, which is sent across isolator 406, electronic lock control 408 opens a door. Notably in this system, sensor 402 and signal conditioning and decision making block 404 are working at low voltage, e.g. using a battery, and electronic lock control 408 is working from high voltage, e.g. the mains power supply. In this system, if a direct connection existed between block 404 and lock control 408, any high voltage transients in the power supply could damage the low voltage circuits or can cause harm to a user of the system. Isolator 406 is used as level shifter between the two voltage levels and also for safety purposes. Any common mode noise is dropped across the isolator, which prevents damage to high-voltage-sensitive circuits. It will be understood that there are many other application in which an isolator is used and multiple reasons for this usage.

Figure 5A:
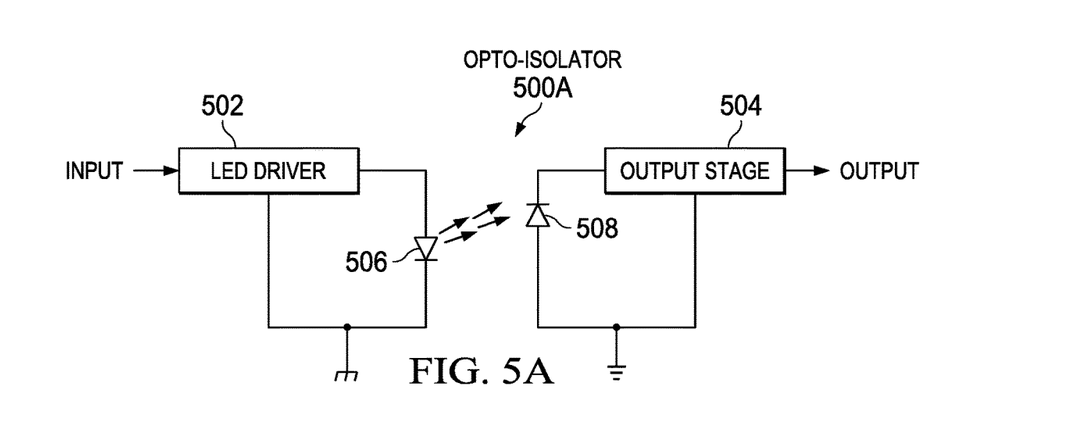
FIG. 5A depicts a block diagram of an opto-isolator.
Figure 5B:
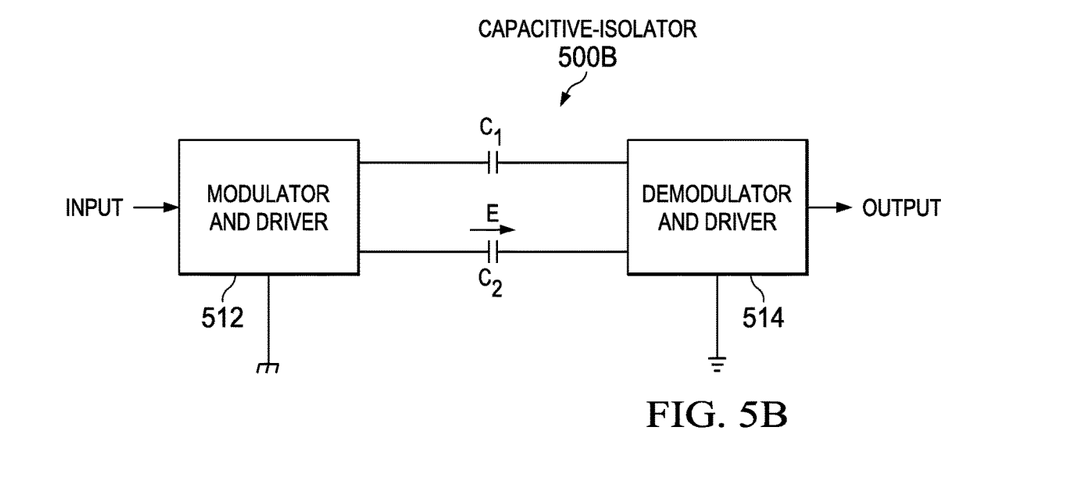
FIG. 5B depicts a block diagram of a capacitive isolator.
Figure 5C:
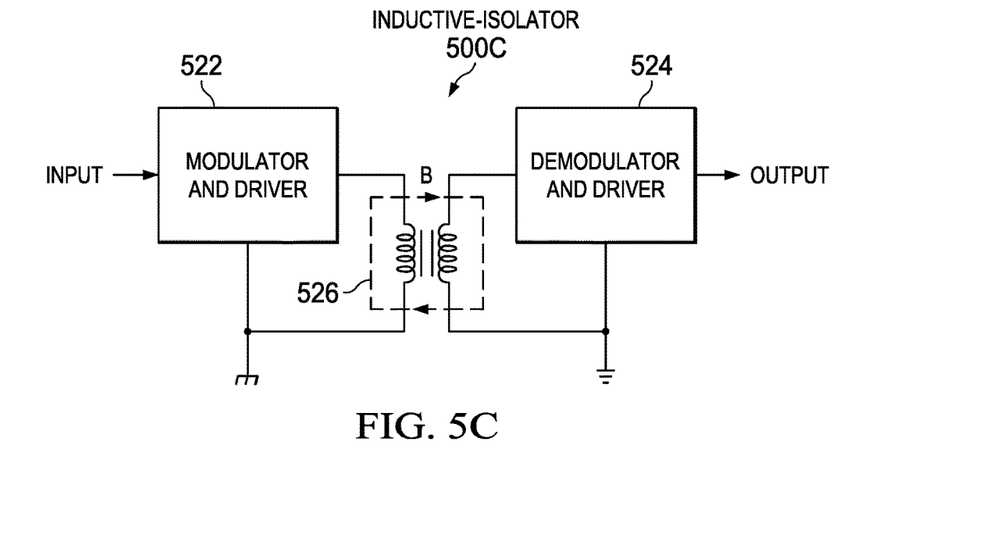
FIG. 5C depicts a block diagram of an inductive isolator.

As noted earlier, isolators can be broadly classified as opto-isolators, capacitive isolators and inductive isolators. These three major types of isolators are shown in FIGS. 5A-C. FIG. 5A illustrates opto-isolator 500A. On the transmitter side of opto-isolator 500A are LED driver 502 and LED 506, while the receiver side includes output stage 504 and photo-diode 508. The barrier in this implementation is the interspace between the transmitter and receiver, with light waves used to transfer data across the barrier.

In FIG. 5B, the transmitter side of capacitive isolator 500B includes modulator and driver 512 and the receiver side includes demodulator and driver 514. The space between the plates of capacitors $C_1$ and $C_2$ forms the isolation barrier in this capacitive isolator and change in the electric field is used to transfer data across the isolation barrier. In FIG. 5C, inductive isolator 500C includes modulator and driver 522 on the transmitter side and demodulator and driver 524 on the receiver side. The space between the primary and secondary windings of transformer 526 acts as the isolation barrier and change in the magnetic field is used to transfer data across the barrier.

In opto-isolators, ON-OFF Keying is implemented by the LED which acts as a transmitter. An opto-isolator inherently derives its power from the input data signal, i.e., the current is switched ON and OFF to provide the signal. Accordingly, unlike other digital isolators, opto-isolators do not need an external power supply. The presently disclosed transmitter has been modelled to replace an LED-based isolator and thus has been designed to utilize the input current to power transmitter circuitry. One of the issues that must be dealt with in isolators is common mode transients, which will be discussed with regard to FIGS. 6A and 6B.

Figure 6A:
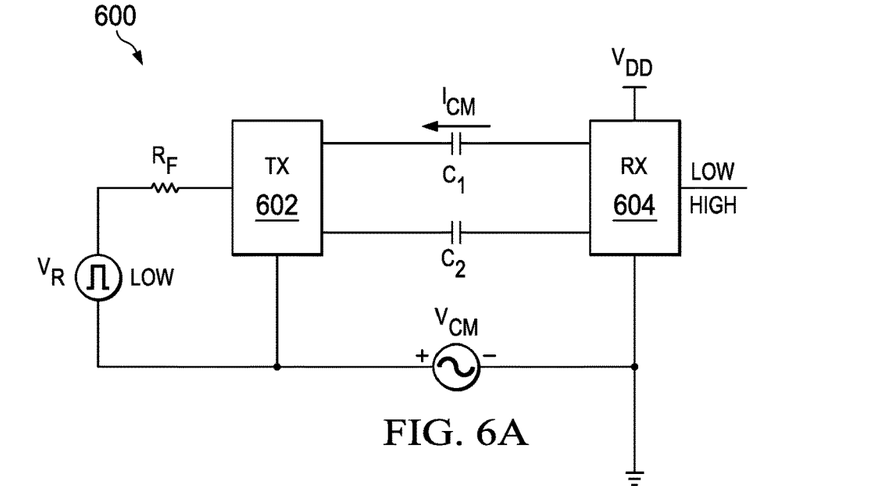
FIGS. 6A-B depict a system containing a capacitive isolator and a graph of a common mode transient and are used to explain how such a transient can affect operation of the transmitter.
Figure 6B:
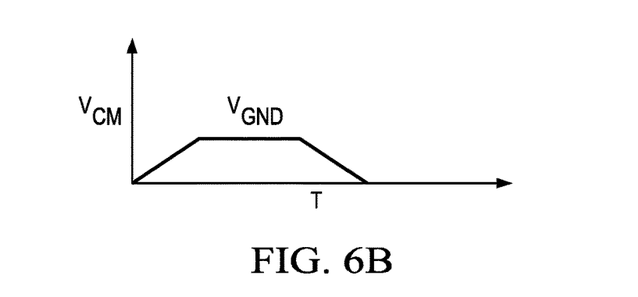

FIG. 6A illustrates capacitive isolator 600, which includes transmitter 602, isolation capacitors $C_1$, $C_2$, and receiver 604 and which may be implemented on a single chip. It is known that parasitic capacitance exists between local ground and connections that couple the transmitter to the capacitor. In ON-OFF keying, when a data signal is low, the transmitter should be OFF. However, if a common mode transient occurs, as modelled in FIG. 6B, the voltage on the ground connection or lower rail rises to a given value $V_{CM}$, remains relatively stable for some duration, and then drops back to zero. During a positive edge of $V_{GND}$, isolation capacitors $C_1$, $C_2$ become charged to common mode voltage $V_{CM}$ due to the parasitic capacitance with local ground. During the falling edge of $V_{GND}$, the isolation capacitors discharge from $V_{CM}$ by pumping current $I_{CM}$ towards transmitter 602. As will be shown in greater detail below, current $I_{CM}$ can turn ON transmitter 602, such that receiver 604 detects the presence of data when no data is intended. In terms of opto-isolators this is called false turn ON, where because of extra current pumped in even when data input is low, the LED turns ON. Such a system can have false turn ON for CMTI values less than 20 KV/μs.

Figure 1:
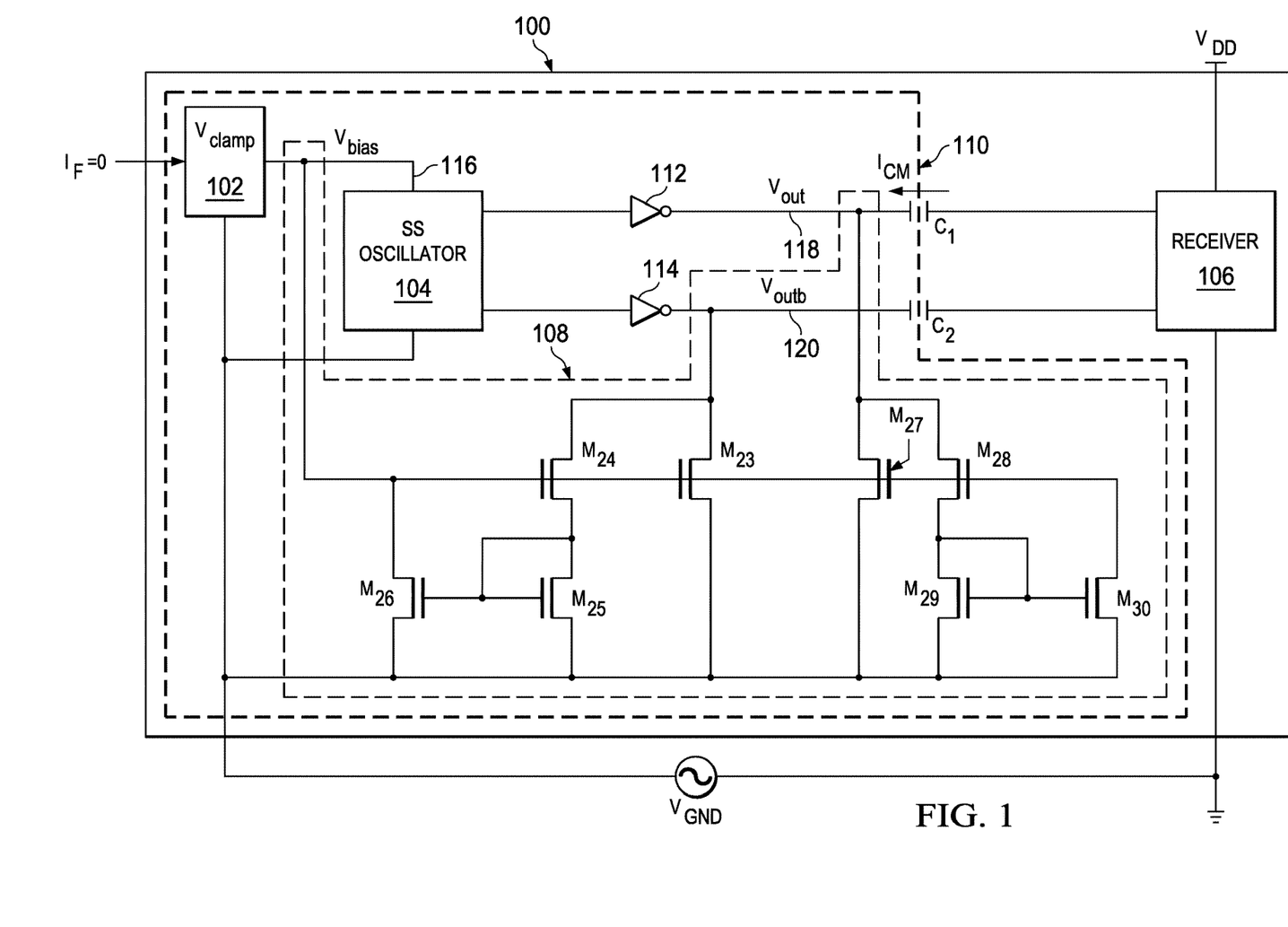
FIG. 1 depicts an example of an isolator chip according to an embodiment of the disclosure.

FIG. 1 illustrates isolator chip 100 that uses capacitive isolation and has a CMTI circuit 108 that provides improved response to common mode transients according to an embodiment of the disclosure. As seen in this figure, isolator chip 100 includes transmitter 110 and receiver 106, which are separated by capacitors $C_1$ and $C_2$. Receiver 106 is shown as a single block, as the exact configuration of the receiver is not a part of this disclosure. Transmitter 110 includes voltage clamp circuit $V_{CLAMP}$ 102, which is coupled to receive an input current $I_F$ in which a two-stage voltage is used to drive ON-OFF Keying. Voltage clamp circuit 102 is coupled to provide bias signal $V_{BIAS}$ 116 to oscillator 104, which supplies differential output signals VOUT 118, VOUTB 120 to inverters 112, 114 and then to capacitors $C_1$, $C_2$. CMTI circuit 108, which includes four p-type metal-oxide-semiconductor (PMOS) transistors $M_{23}$, $M_{24}$, $M_{27}$, $M_{28}$ and four n-type metal-oxide-semiconductor (NMOS) transistors $M_{25}$, $M_{26}$, $M_{29}$, $M_{30}$, is coupled to bias signal 116, output signal 118 and output signal 120, as well as to the local ground. As previously mentioned, in at least one embodiment, isolator chip 100 has been designed to replace existing LED opto-isolators, although it will be understood that the disclosed CMTI circuit can also be used in other situations requiring protection from common mode transients. All of the components in isolator chip 100 may, in some examples, be implemented in a common package.

In one embodiment, transmitter 110 detects the presence of a data signal on receipt of input current $I_F$ that is in the range of 3-8 mA and transmits a change in the electric field across the capacitors $C_1$, $C_2$ when data is present. Voltage clamp circuit 102 uses input current $I_F$ to generate voltage $V_{BIAS}$ on bias signal 116, which powers all other circuit blocks within transmitter 110. In one embodiment, bias signal 116 is a scaled version of a bandgap voltage, i.e., the clamped voltage, $V_{BIAS}$, is substantially temperature independent and provides a fixed voltage regardless of power supply variations, temperature changes and loading. Voltage clamp circuit 102 also ensures the unidirectional operation of the transmitter. In one embodiment, a discharge circuit (not specifically shown) ensures that $V_{BIAS}$ is discharged to ground on a falling edge of this signal, ensuring that initial conditions in the circuit are preserved over time.

Figure 2A:
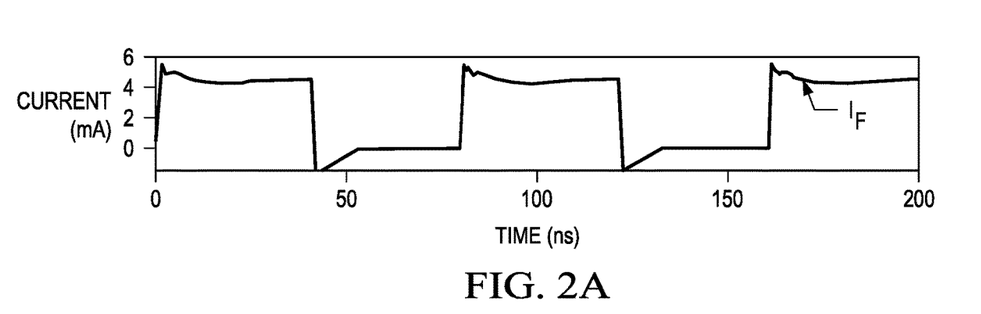
FIGS. 2A-C depict respectively the input current, bias voltage and output voltage on one of the differential signals of FIG. 1 according to an embodiment of the disclosure.
Figure 2B:
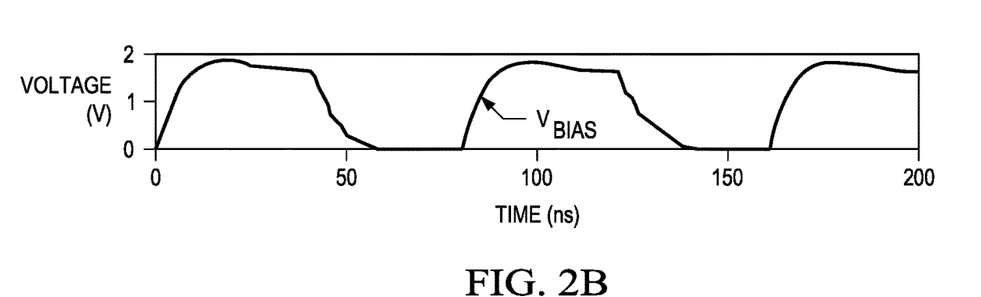
Figure 2C:
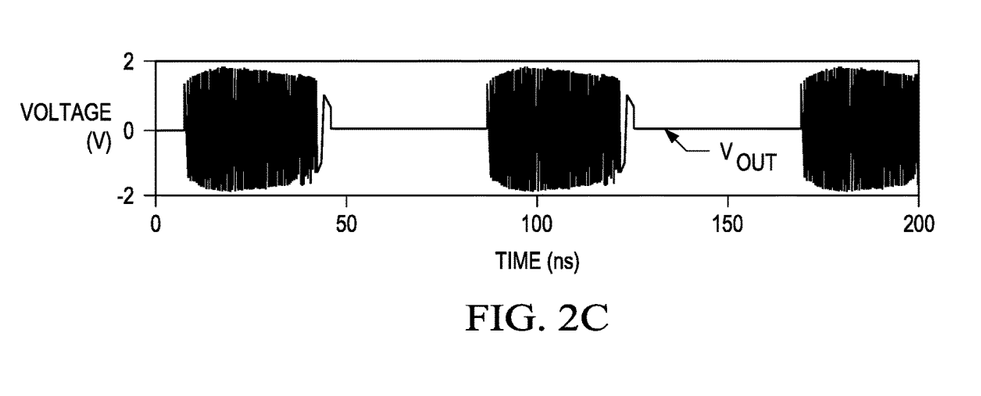

In at least one embodiment, differential oscillator 104 is a source coupled relaxation oscillator that has a rail-to-rail swing and good common mode rejection. Oscillator 104 implements ON-OFF Keying and in one embodiment uses Spread Spectrum Modulation (SSM) to restrict radiative emissions within permissible limits and thereby meet regulatory standards. Further gain and rail-to-rail operation of oscillator 104 is achieved using self-biased (not specifically shown) in oscillator 104. FIGS. 2A-C illustrate the signals provided during the operation of one embodiment of transmitter 110. FIG. 2A illustrates current on input signal $I_F$ over time. As seen in this figure current $I_F$ is providing a series of ones and zeros, represented in this example by a current of about 4 mA and 0 mA respectively. FIG. 2B illustrates the resulting voltages provided on $V_{BIAS}$, which rises over a short period of time to about 1.8 volts, then falls to zero over a short period when $I_F$ ceases. FIG. 2C illustrates the voltage provided on output signal $V_{OUT}$ 118.

In the absence of CMTI circuit 108, common mode transients can cause erroneous data to be transmitted from transmitter 110 to receiver 106 as follows. As previously mentioned with regard to opto-isolators, a parasitic capacitance is formed between local ground and the connectors that couple $V_{OUT}$ and $V_{OUTB}$ to capacitors $C_1$, $C_2$. As noted earlier, a rise in common mode noise or ground noise causes current $I_{CM}$ to be pulled from the circuit during the positive edge of the transient on $V_{GND}$ and for this same current $I_{CM}$ to be provided towards transmitter 110 on the falling edge. Inverters 112, 114, like the other circuit blocks of transmitter 110, receive $V_{BIAS}$ as a power supply (not specifically shown). Given the normally ON state of a PMOS transistor (not specifically shown) in each of inverters 112, 114, current $I_{CM}$ is conducted onto bias signal 116 during a falling edge of a CMTI event even when input current $I_F$ is zero. Because of this current, oscillator 104 can turn ON and begin oscillating, causing receiver 106 to falsely detect the presence of data. Prior to the addition of CMTI circuit 108, isolator chip 100 had false turn ON for CMTI values less than 20 KV/μs.

CMTI circuit 108 provides an alternate path for $I_{CM}$, thus preventing this current from flowing to bias signal 116 and through oscillator 104. The availability of this alternate path for CMTI events while a data signal is low prevents a false turn ON of the output signal while ensuring that the path remains idle during normal operation. In one embodiment, CMTI circuit 108 includes four PMOS transistors $M_{23}$, $M_{24}$, $M_{27}$, $M_{28}$ and four NMOS transistors $M_{25}$, $M_{26}$, $M_{29}$, $M_{30}$, as seen in FIG. 1. The gate of each of PMOS transistors $M_{23}$, $M_{24}$, $M_{27}$, $M_{28}$ is coupled to bias signal 116 and the source of each PMOS transistor is coupled to one of output signals 118, 120, i.e., the source of each of PMOS transistors $M_{23}$, $M_{24}$ is coupled to output signal 120 and the source of each of PMOS transistors $M_{27}$, $M_{28}$ is coupled to output signal 118. The drains of PMOS transistors $M_{23}$, $M_{27}$ are coupled to the lower rail, while the drains of PMOS transistors $M_{24}$, $M_{28}$ are coupled respectively to the drains of NMOS transistors $M_{25}$, $M_{29}$. The gate of NMOS transistor $M_{25}$ is coupled to the gate of NMOS transistor $M_{26}$ and is also coupled to a point between the drains of PMOS transistor $M_{24}$ and NMOS transistor $M_{25}$. Similarly, the gate of NMOS transistor $M_{29}$ is coupled to the gate of NMOS transistor $M_{30}$ and is also coupled to a point between the drains of PMOS transistor $M_{28}$ and NMOS transistor $M_{29}$. The drain of each of NMOS transistors $M_{26}$, $M_{30}$ is coupled to bias signal 116, while the source of each of NMOS transistors $M_{25}$, $M_{26}$, $M_{29}$, $M_{30}$ is coupled to the lower rail.

Figure 3:
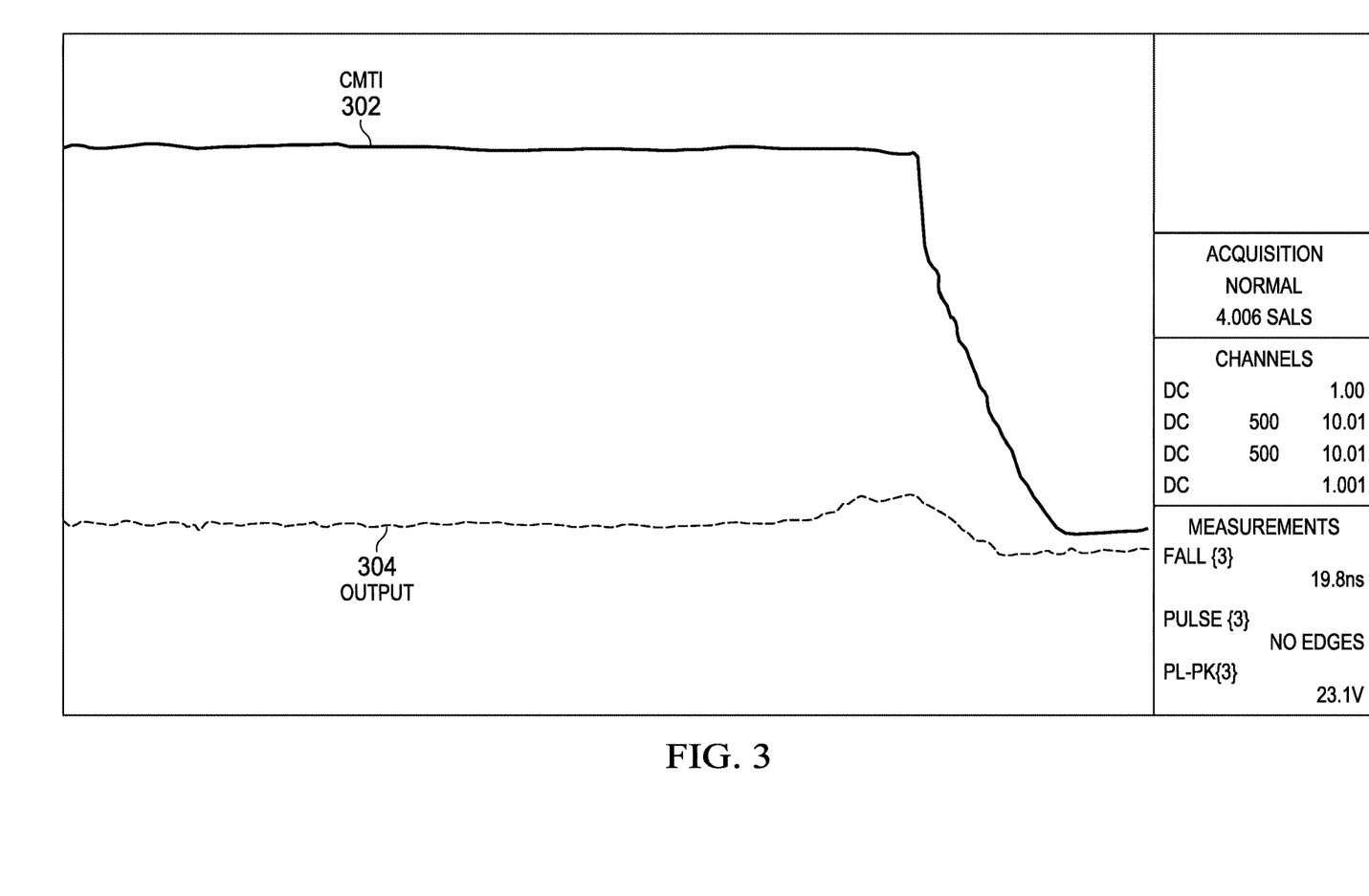
FIG. 3 depicts a CMTI event that occurs when the data signal is low and the corresponding output signal according to an embodiment of the disclosure.

During a CMTI event, voltage $V_{OUT}$ on output signal 118 and voltage $V_{OUTB}$ on output signal 120 increases. As this voltage increases above a threshold voltage $V_{TH}$, transistors $M_{23}$, $M_{24}$, $M_{27}$, $M_{28}$ turn ON as their gate voltage is connected to bias signal 116, whose voltage $V_{BIAS}$ is zero volts. On output signals 118, 120, the current divides, with some current flowing to bias signal 116, but the remaining current flowing to the lower rail through CMTI circuit 108. The current flowing to bias signal 116 is again divided between different circuits (i.e., $V_{CLAMP}$ 102 and oscillator 104) and is not high enough to trigger oscillation of oscillator 104. $M_{26}$ and $M_{30}$ of CMTI circuit 108 ensure that current flowing into the transmitter is negligible and $V_{BIAS}$ voltage remains almost at ground level. Thus CMTI circuit 108 provides an alternate path for CMTI current and prevents false turn ON. In one embodiment containing CMTI circuit 108, transmitter 110 provides a minimum CMTI of 100 KV/μs without false turn ON. FIG. 3 illustrates an experiment performed to test the disclosed CMTI circuit. In this example, a CMTI event 302 of less than or equal to 100 KV/μs is shown, this CMTI event ends while the data signal is low. While the resulting output signal 304 does not remain perfectly flat, the voltage fluctuation is not enough to change the state.

In some examples, this disclosure describes techniques and circuitry for detecting a CMTI event, and selectively enabling a first discharge path (or current path) coupled between one or more output signal nodes (118, 120) of an isolator chip (100) and a low voltage rail (or ground node) in response to detecting the CMTI event. Example current/discharge paths that may be enabled include a current path formed by transistor $M_{23}$, a current path formed by transistor $M_{27}$, a current path formed by transistors $M_{24}$, $M_{25}$, and a current path formed by transistors $M_{28}$, $M_{29}$. The techniques may selectively disable the discharge/current path in response to detecting that the CMTI event has ceased and/or in response to discharging the output voltage nodes to within a threshold voltage of the bias voltage.

To detect the CMTI event, the isolator chip 100 may include one or more circuits that detect whether one or both of the output voltages (118, 120) of the isolator chip 100 is greater than the bias voltage (116) by at least a threshold amount. The circuit may include one or more PMOS transistors each of which may have a first current conduction terminal (e.g., source terminal) coupled to one of the output voltage nodes, a control terminal (e.g., gate terminal) coupled to a bias voltage node, and a second current conduction terminal (e.g., drain terminal) coupled to a either a ground node or a current path that is coupled to a ground node. Example circuits for detecting the CMTI event and/or for detecting whether the output voltage is greater than the bias voltage by a threshold amount include each of transistors $M_{23}$, $M_{24}$, $M_{27}$, $M_{28}$. The detection circuits may also detect when one or both of the output voltages are within a threshold voltage of the bias voltage, and selectively disable the discharge path in response to the detection.

In some examples, in response to enabling the first discharge path between the output nodes and the ground terminal and/or in response to detecting the CMTI event, the isolator chip 100 may selectively enable a second discharge path (or current path) coupled between the bias voltage node and a low voltage rail (or ground node). Examples of the second discharge path or current path may include transistors $M_{26}$ and $M_{30}$. The isolator chip 100 may disable the second discharge path in response to detecting that the CMTI event has ceased and/or in response to disabling the first discharge path.

The isolator chip 100 may include current path control circuitry that causes the second discharge path to be enabled or disabled based on whether the first discharge path is enabled or disabled. The control circuitry may include transistors $M_{24}$, $M_{25}$, $M_{28}$, $M_{29}$. In some examples, transistors $M_{25}$, $M_{26}$ may form a current mirror with an input current terminal coupled to output voltage node 120 (via transistor $M_{24}$) and an output current terminal coupled to the bias voltage node. Similarly, transistors $M_{29}$, $M_{30}$ may form another current mirror with an input current terminal coupled to output voltage node 118 (via transistor $M_{28}$) and an output current terminal coupled to the bias voltage.

In some examples, the bias voltage may be generated by the isolator chip 100 based on an input current that contains input data for the isolator, and the bias voltage may be used to power the oscillator and other components in the transmitter of the isolator. The isolator chip 100 may include a power circuit (e.g., 102) that has a first current input coupled to a data input lead of the isolator, and an output. The output of the power circuit may be coupled to a power input of oscillator 104 and/or to the power input of one or more additional components in the transmitter.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An isolator chip comprising:
   a first compacitor;
   a second compacitor;
   a transmitter circuit configured to provide differential output signals to respective first terminals of the first and the second capacitor, the transmitter circuit comprising:
   a voltage-clamping circuit configured to receive an input signal and to provide a clamped signal;
   an oscillator directly coupled to the clamped signal and to provide the differential output signals, and
   a common mode transient immunity (CMTI) circuit that couples the respective first terminals of the first and second capacitors to a first voltage when the clamped signal is low; and
   a receiver circuit configured to receive the differential signals from respective second terminals of the first and second capacitors.

2. The isolator chip as recited in claim 1 wherein the CMTI circuit comprises first and second PMOS transistors, the first PMOS transistor having a gate coupled to receive the clamped signal, a source coupled between the oscillator and the first capacitor, and a drain coupled to the lower rail, the second PMOS transistor having a gate coupled to receive the clamped signal, a source coupled between the oscillator and the second capacitor, and a drain coupled to the first voltage.

3. The isolator chip as recited in claim 2 wherein the CMTI circuit further comprises third and fourth PMOS transistors, the third PMOS transistor having a gate coupled to receive the clamped signal, a source coupled to a point between the output signal and the source of the first PMOS transistor and a drain coupled to a drain of a first NMOS transistor, the fourth PMOS transistor having a gate coupled to receive the clamped signal, a source coupled to a point between the output signal and the source of the second PMOS transistor and a drain coupled to a drain of a second NMOS transistor.

4. The isolator chip as recited in claim 3 wherein the CMTI circuit further comprises third and fourth NMOS transistors, a source of each of the first, second, third and fourth NMOS transistors being coupled to the first voltage, the third and fourth NMOS transistors each having a drain coupled to receive the clamped signal, the third NMOS transistor having a gate coupled to the gate of the first NMOS transistor and further coupled between the drain of the third PMOS transistor and a drain of the first NMOS transistor, the fourth NMOS transistor having a gate coupled to the gate of the second NMOS transistor and further coupled between the drain of the fourth PMOS transistor and a drain of the second NMOS transistor.

5. The isolator chip as recited in claim 4 wherein the transmitter circuit derives power from the input signal.

6. The isolator chip as recited in claim 5 wherein the oscillator uses spread spectrum modulation.

7. An ON-OFF Keying (OOK) transmitter comprising:
 a first capacitor;
 a second capacitor;
 an oscillator configured to provide a first signal to a first terminal of the first capacitor and configured to provide a second signal to a first terminal of the second capacitor, the first and the second signals forming a differential pair;
 a voltage-clamping circuit configured to receive an input signal and to provide a directly coupled clamped signal to the oscillator; and
 a common mode transient immunity (CMTI) circuit configured to provide a first voltage on the first terminal of the first capacitor and to provide the voltage on the second terminal of the second capacitor when the clamped signal is low.

8. The OOK transmitter as recited in claim 7 wherein the CMTI circuit comprises first and second PMOS transistors each having a gate configured to receive the clamped signal and a drain coupled to the first voltage, the first PMOS transistor having a source coupled between the oscillator and the first capacitor, and the second PMOS transistor having a source coupled between the oscillator and the second capacitor.

9. The OOK transmitter as recited in claim 8 wherein the CMTI circuit further comprises third and fourth PMOS transistors having respective gates configured to receive the clamped signal, the third PMOS transistor having a source coupled between the source of the first PMOS transistor and the first terminal of the first capacitor and having a drain coupled to a drain of a first NMOS transistor, the first NMOS transistor having the drain and a gate coupled together and having a source coupled to the first voltage, the fourth PMOS transistor having a source coupled between the source of the second PMOS transistor and the first terminal of the second capacitor and having a drain coupled to a drain of a second NMOS transistor, the second NMOS transistor having the drain and a gate coupled together and having a source coupled to the first voltage.

10. The OOK transmitter as recited in claim 9 wherein the CMTI circuit further comprises a third and a fourth NMOS transistor, the third NMOS transistor having a source configured to receive the clamped signal, a drain coupled to the first voltage, and a gate coupled to the gate of the first NMOS transistor, the fourth NMOS transistor having a source coupled to receive the clamped signal, a drain coupled to the first voltage, and a gate coupled to the gate of the second NMOS transistor.

11. The OOK transmitter as recited in claim 10 wherein the OOK transmitter derives power from the input signal.

12. The OOK transmitter as recited in claim 5 wherein the oscillator uses spread spectrum modulation.

\* \* \* \* \*